(No Model.)
F. J. KNAPP.
CROCK MOLDING MACHINE.
No. 579,755. Patented Mar. 30, 1897.
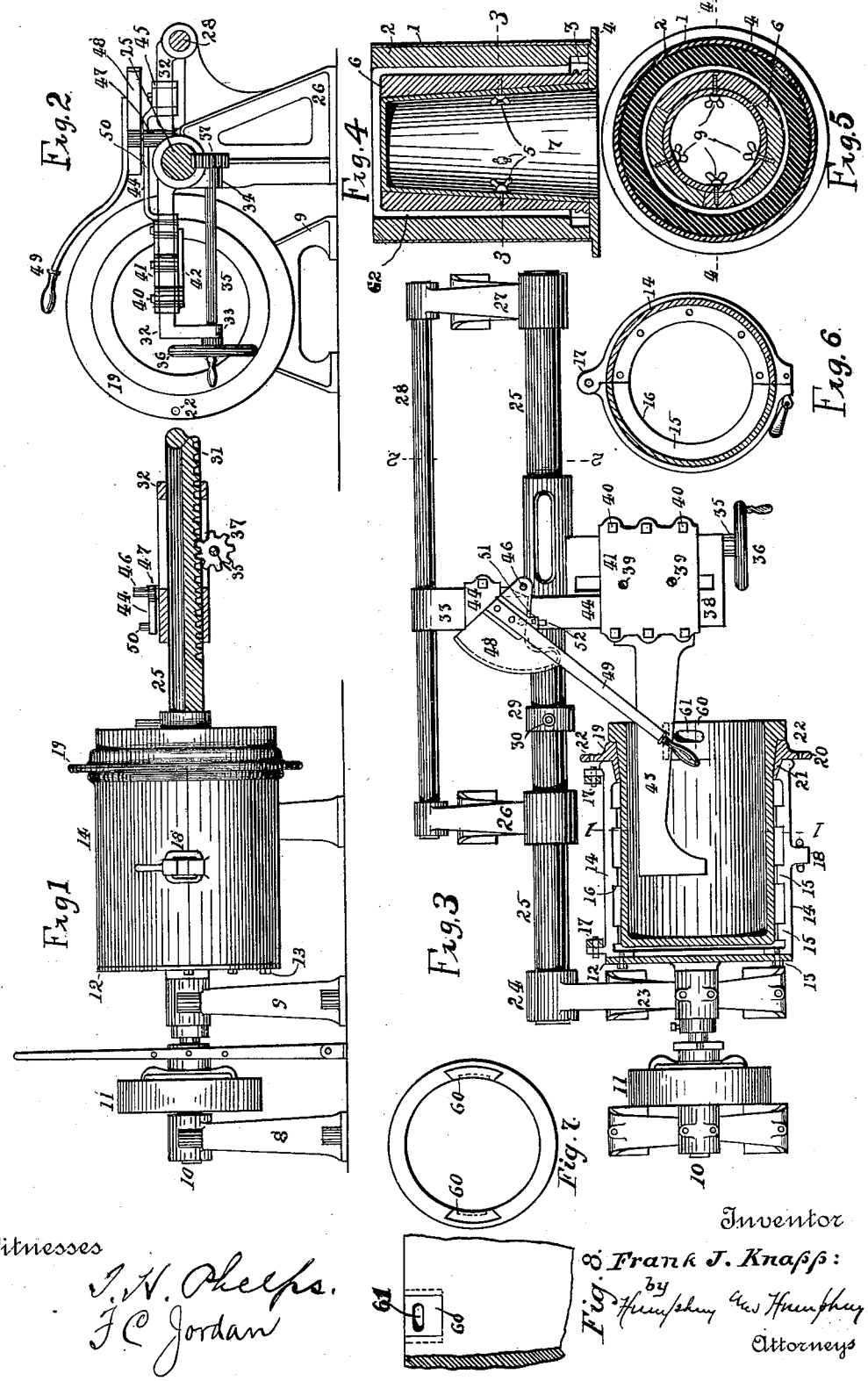
Witnesses
J. N. Phelps.
J. C. Jordan
Inventor
Frank J. Knapp:
by
Humphrey and Humphrey
Attorneys

UNITED STATES PATENT OFFICE.

FRANK J. KNAPP, OF AKRON, OHIO, ASSIGNOR TO MANDUS M. HUNSICKER, OF SAME PLACE.

CROCK-MOLDING MACHINE.

SPECIFICATION forming part of Letters Patent No. 579,755, dated March 30, 1897.

Application filed May 19, 1896. Serial No. 592,138. (No model.)

*To all whom it may concern:*

Be it known that I, FRANK J. KNAPP, a citizen of the United States, residing at Akron, in the county of Summit and State of Ohio, have invented a certain new and useful Improvement in Crock-Molding Machines, of which the following is a specification.

My invention has relation to machines for producing crocks and jars from plastic clay; and it has for its objects the constructing of a machine and its appropriate molds for the rapid, easy, and cheap manufacture of crocks, jars, &c., of earthenware, and particularly those of large size known to the trade as "meat-tubs."

To the aforesaid objects my invention consists in the peculiar and novel construction, combination, and arrangement of the various parts hereinafter described and then specifically claimed, reference being had to the accompanying drawings, forming a part of this specification.

In the accompanying drawings, in which similar reference-numerals indicate like parts in the different figures, Figure 1 is a side elevation of my improved machine; Fig. 2, a transverse section at the line 2 2, Fig. 3; Fig. 3, a plan of my machine with the mold and its casing in section; Fig. 4, a section at the line 4 4 of Fig. 5; Fig. 5, a section at the line 3 3 of Fig. 4; Fig. 6, a section of the mold-casing at the line 1 1 of Fig. 3; Fig. 7, a plan of the mold; Fig. 8, an internal view of the same with sides broken away to better illustrate the dovetailed pockets.

In constructing these meat-tubs it is very desirable that they should have cylindrical sides, or preferably slightly-concaved sides, and on account of the natural shrinkage of the clay in drying they can be readily withdrawn from the molds; but the manufacture of the molds themselves is attended with great difficulty, and this is an objection I seek to overcome and will describe first.

In Figs. 4 and 5, I represents a hollow cylinder open at both ends, of sheet-iron or wood. Within this is a lining of plaster 2, and a shoulder 3 cut therein at one end. This plaster-lined cylinder stands on a base-plate 4, rising from the center of which is a hollow dome 5, shaped like the frustum of a cone and integral therewith, closed at the upper or smaller end, and which forms the core of the mold I am now describing. Surrounding this dome 5 are placed longitudinal strips of plaster lagging 6, held temporarily in place by screws 7. The outside of this lagging is cylindrical or slightly convexed to the form desired for the interior of the meat-tub to be made therein.

The center of the dome 5 and the center of the cylinder 1 are identical, and between the lagging 6 and lining 2 is an annular space 62, corresponding in shape to the desired mold. Into this space is poured soft plaster-of-paris, which when hardened is removed therefrom as follows: The whole device is inverted and the screws 7 removed, and base-plate 4, with its dome 5, is lifted out, and the strips of lagging 6 are removed one at a time, and then the finished mold is lifted out ready for use.

It is best to make crocks with the handles on them, as handles put on afterward have never proven satisfactory, and in order to accomplish this I cut out of the upper interior sides of the plaster mold two pockets (see Figs. 7 and 8) concentric with the sides and dovetailed to hold in place the pieces now to be described. These are curved pieces 60, of plaster-of-paris, with beveled edges, which fit nicely in the pockets before mentioned. They have on their inner faces a groove 61. Now the clay is pressed into the grooves 61, and this of course results in a projecting ridge being formed on the outside of the crocks in any desired form and which may be changed by altering the form of the grooves 61. If these pieces were not there, the clay entering the grooves would prevent the withdrawal of the finished crocks, but as it is here described the pieces lift out with the crocks.

The machine in which I use this mold consists of a pair of upright journal-bearing housings 8 and 9, in the journals of which runs a horizontal shaft 10. This shaft bears a preferred form of clutch-pulley 11 to operate it by a belt from any desired power, and at the inner end a face-plate 12, against which it terminates. To the face of this plate 12 is held by bolts 13 a longitudinally-divided cylindrical-shaped chuck 14, having internal annular ridges 15, with their inner faces padded with leather 16. This chuck, as before stated, is split longitudinally, and the lower and upper halves are united by hinges 17 and lock 18. The mouth of this chuck is beveled a little for a purpose to be stated. The object of this chuck is to hold the plaster-of-paris mold within which is formed the desired meat-tub. Before the mold is placed in the chuck a metallic ring 19 is placed around the cylindrical portion thereof, snugly against the shoulder, and with this ring on the mold is placed in the chuck and the upper half locked down on it, holding it securely. The ring 19 has two flanges 20 and 21. The flange 20 is radial and is perforated by two holes 22, into which the hooks of a traveling crane can be fastened for ease in lifting the mold into and out of the chuck. The flange 21 is a dependent one with an external contour corresponding to the internal bevel of the mouth of the chuck into which it enters.

Projecting from housing 9 is an arm 23, terminating in a sleeve 24, which supports a non-rotating shaft 25. The shaft 25 is also supported by double housings 26 and 27. These two also support a smaller parallel non-rotating shaft 28. On shaft 25 is an adjustable collar 29, having an upright pin 30 rising therefrom. In the under side of shaft 25 are cut rack-teeth 31.

The mechanism which forms the interior of the meat-tub consists of a former or mandrel carried forward and backward and pressed against its work by devices mounted on a traveling carriage on the shafts 25 and 28, and which is detailed as follows: The carriage consists of the frame 32, having holes bored through it to receive the before-mentioned shafts and on which it slides. Depending from this frame 32 are two arms 33 and 34, in which is journaled a short shaft 35, bearing on its free end a hand-wheel 36 and on the other end a pinion 37, meshing into the rack-teeth on the under side of shaft 25, and by which mechanism the carriage 32 is actuated. The projecting arm 38 of the carriage 32 is slotted, through which pass bolts to unite two plates 41 and 42, which sustain one arm of a former or mandrel 43, which projects into the mold and presses the clay against the inside of the mold. This plate 41 is connected by a strap 44 with a similar sliding box-like frame 45, surrounding the frame 32 between the two shafts 25 and 28, so that the box 45 slides to and fro in unison with the movements of plates 41 and 42. In order to control the sliding of these, a pin 46 is fixed upright in a projecting boss 47 near the center of the sleeve inclosing the shaft 25. On the pin 46 is pivoted a crank 48, shaped something like a triangle, bearing a hand-lever 49. On the strap 44 is an upright pin 50, directly beneath this crank 48, and on the side of the crank 48 is a lug 51, through which passes a pin 52, held by a set-screw. The end of the pin 52 encounters the pin 50 on the strap, while the crank pivots on the pin 46 on the frame, and thus throws the sliding boxes 41 and 45 across the carriage and the former 43 against its work.

In order to prevent the carriage moving endwise from the chuck 14, there is cut on the under side of the crank 48 a groove concentric with its pivot, (shown in dotted lines,) and the pin 30 on collar 29 enters and remains in this groove while the machine is working, holding it firmly in place, to be easily released when the lever 49 is thrown far enough to one side.

What I claim is—

1. In a machine of the class designated the combination with a horizontal revoluble shaft suitably mounted, a face-plate on one of the ends of said shaft, a divided chuck, with the halves thereof hinged together, one half thereof being fastened to said plate, a series of padded ridges on the interior of said chuck, a mold held within said chuck and on said ridges, of a former mounted on independent mechanism adapted to approach and enter said mold substantially as shown and described.

2. In a machine of the class designated the combination with a horizontal revoluble shaft suitably mounted, a face-plate, on said shaft, a chuck divided in halves, one half thereof being fastened to said plate, the two halves of said chuck being hinged together, a mold having a shoulder held within said chuck, an annular ring with a perforated flange placed within the mouth of said chuck and encircling said mold below its shoulder, and an independently-mounted former adapted to approach and enter said mold, substantially as shown and described.

3. In a machine of the class designated the combination with a horizontal revoluble mold-holding chuck, of a pair of horizontal non-rotating shafts parallel with the axis of said chuck, one of said shafts provided with rack gear-teeth cut within its periphery, a frame adapted to slide on said shafts, a short shaft mounted transversely to said rack-shaft in said frame, a pinion and a hand-wheel mounted thereon, said pinion meshing in said rack and arranged through the hand-wheel to actuate said frame, a carriage movably mounted on said frame, a former on said carriage to enter said mold, and capable of motion transversely of said carriage and means for moving said carriage across said frame substantially as shown and described.

4. In a machine of the class designated the combination with a horizontal revoluble mold-holding chuck, of a pair of horizontal non-rotating shafts parallel to the axis of said chuck, a frame sliding on said shafts, a carriage mounted on said frame and adapted to be moved across said frame, a vertical pin on said frame, a crank provided with a hand-lever pivoted on said pin, an adjustable horizontal pin on said crank, an upright pin on said carriage, adapted to be encountered by said horizontal pin and through said crank and hand-lever to actuate said carriage transversely across said frame, substantially as shown and described.

5. In a machine of the class designated the combination with a horizontal revoluble mold-holding chuck, of a pair of horizontal nonrotating shafts parallel to the axis of said chuck, a frame sliding on said shafts, a carriage carrying a projecting former adapted to enter said mold, and adapted to be moved across said frame, a crank and hand-lever adapted to actuate said carriage transversely across said frame, said crank having on its under side a groove concentric with its center, a collar having an upright pin tight on one of said shafts, adapted to enter said groove and prevent backward motion of the frame while said crank and hand-lever are operated substantially as shown and described.

6. In a device for the manufacture of molds for machines of the class designated, the combination of a hollow tapering core, closed at its smaller upper end, plaster lagging in horizontal strips placed around said core, a number of hand-screws fastening into the lagging from within the case, with an outer inclosing shell, a plaster lining divided into halves and an annular space between said lagging and lining into which the plastic substance for the mold is poured, substantially as shown and described.

7. In a mold for machines of the class designated, the combination with a mold having a number of dovetailed pockets cut into the internal circumference thereof, of an equal number of loose pieces of like configuration with said pockets and adapted to fit therein, and each having on its concave surface a preferred form of groove substantially as shown and described.

In testimony that I claim the above I hereunto set my hand.

FRANK J. KNAPP.

In presence of—
C. E. HUMPHREY,
C. P. HUMPHREY.